United States Patent
Geraud (10) Patent No.: US 12,177,337 B2
(45) Date of Patent: Dec. 24, 2024

(54) METHOD FOR COGENERATING A SHARED CRYPTOGRAPHIC MATERIAL, DEVICES, SYSTEM AND CORRESPONDING COMPUTER PROGRAM

(71) Applicant: Banks and Acquirers International Holding, Paris (FR)

(72) Inventor: Rémi Geraud, Valence (FR)

( * ) Notice: Subject to any disclaimer, the term of this patent is extended or adjusted under 35 U.S.C. 154(b) by 235 days.

(21) Appl. No.: 17/782,474

(22) PCT Filed: Nov. 25, 2020

(86) PCT No.: PCT/EP2020/083427
§ 371 (c)(1),
(2) Date: Jun. 3, 2022

(87) PCT Pub. No.: WO2021/110518
PCT Pub. Date: Jun. 10, 2021

(65) Prior Publication Data
US 2023/0006812 A1   Jan. 5, 2023

(30) Foreign Application Priority Data
Dec. 5, 2019  (FR) ...................................... 1913816

(51) Int. Cl.
*H04L 9/08* (2006.01)
*H04L 9/06* (2006.01)

(52) U.S. Cl.
CPC ............ *H04L 9/085* (2013.01); *H04L 9/0643* (2013.01); *H04L 9/0869* (2013.01)

(58) Field of Classification Search
CPC ...... H04L 9/085; H04L 9/0643; H04L 9/0869
(Continued)

(56) References Cited

U.S. PATENT DOCUMENTS 9,979,794 B2   5/2018   Mikhailov et al.

FOREIGN PATENT DOCUMENTS

WO   WO-2012052079 A1 *  4/2012   ........... H04L 9/0855

OTHER PUBLICATIONS

English translation of the Written Opinion of the International Searching Authority dated Jan. 13, 2021 for corresponding International Application No. PCT/EP2020/083427, filed Nov. 25, 2020.
(Continued)

*Primary Examiner* — Zi Ye
(74) *Attorney, Agent, or Firm* — David D. Brush; Westman, Champlin & Koehler, P.A.

(57) ABSTRACT

In a method for cogenerating a shared cryptographic material implemented within a first electronic device, which is connected to a second electronic cogeneration device and to a third electronic cogeneration device, a shared encryption material (pkx) is determined, as a function of a set of cogeneration parameters ECG. The shared encryption material (pkx) is transmitted, and corresponding shared encryption materials (pky, pkz) are received from the other devices. A shared seed (mx) is computed as a function of the shared encryption materials (pkx, pky, pkz) and the set of cogeneration parameters ECG. A masked form (Ox) of said shared seed (mx) is transmitted, and masked forms (Oy, Oz) of corresponding shared seeds (my, mz) are received. A final seed (ad) is computed as a function of the masked forms (Ox, Oy, Oz) of the shared seeds (mx, my, mz) and the set of cogeneration parameters ECG.

9 Claims, 3 Drawing Sheets

(58) Field of Classification Search
USPC .......................................................... 380/44
See application file for complete search history.

(56) References Cited

OTHER PUBLICATIONS

International Search Report dated Dec. 17, 2020 for corresponding International Application No. PCT/ EP2020/083427, Nov. 25, 2020.
Written Opinion of the International Searching Authority dated Dec. 17, 2020 for corresponding International Application No. PCT/EP2020/083427, filed Nov. 25, 2020.
French Search Report and Written Opinion with English machine translation dated May 25, 2020 for corresponding French Application No. 1913816, filed Dec. 5, 2019.
Ewa Syta et al., "Scalable Bias-Resistant Distributed Randomness", Iacr, International Association for Cryptologic Research, vol. 20170322:091634, Mar. 22, 2017 (2017-03-22), p. 1-17, XP061022720.
Mark Manulis et al., "Modeling Leakage of Ephemeral Secrets in Tripartite/Group Key Exchange", Ieice Transactions On Fundamentals of Electronics, Communications and Computer Sciences, Engineering Sciences Society, Tokyo, Jp, vol. E96-A, No. 1, Jan. 1, 2013 (2013-01-01), p. 101-110, KP001581210.

* cited by examiner

METHOD FOR COGENERATING A SHARED CRYPTOGRAPHIC MATERIAL, DEVICES, SYSTEM AND CORRESPONDING COMPUTER PROGRAM

CROSS-REFERENCE TO RELATED APPLICATIONS

This Application is a Section 371 National Stage Application of International Application No. PCT/EP2020/083427, filed Nov. 25, 2020, which is incorporated by reference in its entirety and published as WO 2021/110518 A1 on Jun. 10, 2021, not in English.

1. TECHNICAL FIELD

The disclosure relates to the field of encryption. More particularly, the disclosure relates to the generation of basic cryptographic materials used to secure data exchanged between two devices. Such situations can be encountered, for example, in the field of the Internet of Things (IoT): smart metering, smart parking, health monitoring, environmental monitoring and other applications are typical examples of systems requiring data encryption. While cost and energy efficiency are the main factors contributing to the popularity of commercial devices in the IoT field, security features are under increasing demand. Payment functions, which are implemented either online or offline, also rely on the confidentiality of the data exchanged between the devices involved in the payment transaction itself, for example a smartphone and a payment terminal or a personal computer and an online merchant's server.

2. PRIOR ART

The encryption of the exchanges taking place between two parties is a problem that dates back several millennia. With the advent of computerised systems and the development of adequate mathematical theory, encryption techniques have become more secure and efficient. In particular, complex cryptosystems have emerged, such as RSA ("Rivest, Shamir and Adleman"), which have made it possible to secure many systems around the world. With the evolution of technology, many devices are equipped with encryption and decryption capabilities using efficient, published and tested algorithms to guarantee the confidentiality of the data exchanges, often materially. This is the case, for example, with the RSA 2048 algorithm. However, this algorithm, like others, relies on the determination of random numbers.

More particularly, for RSA, the generation of a key pair (private/public) requires choosing two large prime numbers, so that it is computationally impossible to factor the product thereof (i.e. to determine, from their product alone, the two integers that were used to obtain this product).

To determine a large prime number, a method is used that provides a random odd integer of sufficient size on demand: a primality test is used to determine whether or not this integer is prime, and the method is stopped as soon as a prime number is obtained. The prime number theorem ensures that a prime number is found after a reasonable number of tries. The method requires the use of a rapid primality test. Thus, as a rule, a probabilistic test is implemented, such as the Miller-Rabin primality test or a variant of such a test. There is no guarantee that the number is actually prime, but only a high probability that it is. Typically, these operations are now integrated into many devices and/or code libraries as standard and used in a standard way. Thus, the aforementioned devices are equipped with integrated circuits that can implement data encryption protocols in an accelerated way, making it more or less transparent to the system.

However, for RSA or other cryptosystems, the sole description of the mathematical principles on which the algorithm relies is not sufficient. The actual implementation requires other parameters that are essential for security to be considered. For example, the pair (private key, public key) must be generated by a truly random method, which method, even if it were known, would not allow the private key to be reconstructed.

However, although cryptographic algorithms for confidentiality and authenticity are hardware-supported on a common class of peripherals, as explained hereinabove, there is generally no adequate support for the generation of random numbers (also referred to as "seeds" in the literature) in consumer hardware: more specifically, protecting the support for random number generation requires applying hardware devices that act as shields making the random number generation insensitive to external perturbations, which is expensive and thus overlooked by manufacturers. Thus, it is often possible to passively (or actively) manipulate the embedded random number generation source, and thus possible to undermine the security provided by (otherwise) strong cryptographic algorithms. In other words, by modifying the way random numbers are produced, the complexity of the mathematical problems underlying the obtaining of private keys can be significantly reduced, and thus the effectiveness of an encryption algorithm that is known to be efficient can be reduced or decimated.

This is typically the situation for consumer mobile devices or IoT devices that are not designed for cryptography. They do not incorporate hardware components or software dedicated to high-quality seed generation. At best, some high-end devices are equipped with a "security module", the design and entropy sources whereof are usually kept secret and thus cannot be audited.

One natural solution is to use an external peripheral, such as a HSM or a remote server, to provide a random source. Since the communication has a cost, only one random number ("seed") is usually provided, from which a pseudo-random bit sequence is derived. However, the transmission of this random number by the remote server itself uses an encryption algorithm that uses . . . a random number. Thus, the solution of using a remote device is itself hampered by the need to first implement a random number-based encryption solution which is of course generated on the so-called "insecure" device. Such a hardware flaw allows an attacker to capture (or infer or choose) the random number and obtain all of the pseudo-random bits used by the peripheral, which is of course unwanted.

Thus, in order to establish a secure communication channel with the consumer peripheral, high-quality random numbers are firstly required. There is thus a need to provide a method for obtaining a secure random number that allows qualitative random numbers to be obtained in a secure manner.

3. SUMMARY OF THE INVENTION

The disclosure at least partially addresses the issues raised in the prior art. More particularly, the disclosure relates to a method for cogenerating a shared cryptographic material, which method is implemented within a first electronic device, said first electronic device being connected to a second electronic cogeneration device and to a third electronic cogeneration device. Such a method comprises:
- a step of determining a shared encryption material, as a function of said set of cogeneration parameters ECG;
- a step of transmitting said shared encryption material;
- a step of receiving corresponding shared encryption materials originating from the other devices;
- a step of computing a shared seed, as a function of said shared encryption materials and said set of cogeneration parameters ECG;
- a step of transmitting a masked form of said shared seed;
- a step of receiving masked forms of the corresponding shared seeds originating from the other devices;
- a step of computing the final seed, as a function of the masked forms of said shared seeds and said set of cogeneration parameters ECG.

Thus, it is possible to obtain a high-quality (i.e. with a very high probability of randomness) final seed in a simple manner, even if one of the devices involved in the elaboration thereof is compromised.

According to one specific embodiment, the step of determining the shared encryption material, as a function of said set of cogeneration parameters ECG comprises:
- a step of selecting, within a cyclic group G, a number sx, smaller than p;
- a step of computing the shared encryption material by performing an operation for the number sx with the generator g of the group G.

Thus, a secure encryption material can be obtained. The operation implemented is, for example, a multiplication or an exponentiation and it varies as a function of the selected group, which increases security.

According to one specific embodiment, the step of computing the shared seed, as a function of said shared encryption materials and said set of cogeneration parameters ECG comprises:
- a step of obtaining a random number rx;
- a step of computing the shared seed rx from the random number rx and the shared encryption materials pkx, pky, pkz and a hash function H;

Each participant thus uses the data provided by the other participants and by itself to generate a shared seed.

According to one specific feature, the step of computing the final seed, as a function of the masked forms of said shared seeds and said set of cogeneration parameters ECG comprises:
- a step of adding the masked forms; and
- a step of hashing, using a hash function H, the result of the previous addition, outputting the final seed.

Thus, none of the participants can negatively influence (i.e. in the sense of reducing security) the generation of the final seed.

According to one specific embodiment, the cyclic group belongs to the group comprising:
- Curve25519;
- sec256p;
- head 25619;
- Curve448.

According to one specific embodiment, said hash function belongs to the group comprising:
- SHA-1;
- MD5;
- SHA-3, in SHAKE128 mode.

According to one specific feature, the cogeneration method further comprises a step of verifying the validity of the final seed comprising generating a random number and computing a hash value of a sum of said random number and the final seed.

Thus, each device participating in the cogeneration is able to verify that the other devices have the same shared final seed.

The disclosure further relates to a device for cogenerating a shared cryptographic material, which method is implemented within a first electronic device, said first electronic device being connected to a second electronic cogeneration device and to a third electronic cogeneration device.

Such a device comprises:
- means for determining a shared encryption material, as a function of said set of cogeneration parameters;
- means for transmitting said shared encryption material;
- means for receiving the corresponding shared encryption materials originating from the other devices;
- means for computing a shared seed, as a function of said shared encryption materials and said set of cogeneration parameters;
- means for transmitting a masked form of said shared seed;
- means for receiving masked forms of the corresponding shared seeds originating from the other devices;
- means for computing the final seed, as a function of the masked forms of said shared seeds and said set of cogeneration parameters.

Such a device can be in the form of a user communication terminal, equipped with a general purpose processor, that is not necessarily secure. It can also take the form of a secure element or equivalent, also present within (or connected to) a user communication terminal, comprising a secure processor. It can also take the form of a remote server. It can also take the form of a payment terminal or an authentication terminal with secure data processing components.

The disclosure further relates to a system for cogenerating a shared cryptographic material. Such a system comprises at least three cogeneration devices as presented hereinabove connected to one another. More particularly, in one embodiment, such a system can comprise a user communication terminal, provided with a general purpose processor, that is not necessarily secure; a secure element or equivalent, also present within (or connected to) the user communication terminal, comprising a secure processor; a remote server, connected to the communication terminal. Each of these three devices implements the method described hereinabove to achieve, within the scope of this system, the generation of a final seed as proposed.

According to a preferred implementation, the different steps of the methods according to the present disclosure are implemented by one or more software or computer programs, comprising software instructions intended to be executed by a data processor of an execution device according to the present technique and being designed to command the execution of the different steps of the methods, implemented with the communication terminal, the electronic execution device and/or the remote server, within the scope of a distribution of the processing operations to be carried out and determined by a scripted source code.

As a result, the present technique is also directed towards programs, capable of being executed by a computer or by a data processor, which programs include instructions for commanding the execution of the steps of the methods as mentioned hereinabove.

A program can use any programming language and be in the form of a source code, object code, or intermediate code between a source code and an object code, such as a partially compiled form, or in any other desired form.

The present technique is also directed towards a data carrier readable by a data processor, and including instructions of a program as mentioned hereinabove.

The data carrier can be any entity or device capable of storing the program. For example, the carrier can include a storage means, such as a ROM, for example a CD-ROM or a microelectronic circuit ROM, or even a magnetic recording means, for example a mobile medium (memory card) or a hard drive or a SSD.

On the other hand, the data carrier can be a transmittable medium such as an electric or optical signal, which can be carried via an electric or optical cable, by radio, or by other means. The program according to the present technique can in particular be downloaded from an Internet-type network.

Alternatively, the data carrier can be an integrated circuit into which the program is incorporated, the circuit being suitable for executing or for use in the execution of the method in question.

According to one embodiment, the present technique is implemented by means of software and/or hardware components. With this in mind, the term "module" in this document can refer to a software component, a hardware component or a combination of hardware and software components.

A software component corresponds to one or more computer programs, one or more sub-programs of a program, or more generally any element of a program or software capable of implementing a function or a set of functions, as described hereinbelow for the module concerned. Such a software component is executed by a data processor of a physical entity (terminal, server, gateway, set-top-box, router, etc.) and is capable of accessing the hardware resources of this physical entity (memories, recording media, communication buses, electronic input/output cards, user interfaces, etc.).

Similarly, a hardware component corresponds to any element of a hardware assembly capable of implementing a function or a set of functions, depending on the case described hereinbelow for the module concerned. It can be a programmable hardware component or a component with an integrated processor for executing software, for example an integrated circuit, an integrated circuit card, a memory card, an electronic card for executing firmware, etc.

Each component of the system described hereinabove naturally implements its own software modules.

The various embodiments mentioned hereinabove can be combined with one another in order to implement the present technique.

4. BRIEF DESCRIPTION OF THE FIGURES

Other features and advantages will be better understood upon reading the following description given of a non-limiting preferred embodiment, provided for illustration purposes with reference to the accompanying drawings, in which.

5. DETAILED DESCRIPTION

The general principle of the present technique is based on the implementation of a tripartite generation of a random number. As explained hereinabove, with reference to the prior art, when looking to obtain a high-quality random number on a conventional user device (of the smartphone or IoT type, etc.), a server is used, which will be responsible for providing such a number, with the risk, however, that this number (or the pseudo-random number derived from this number) will be intercepted, thus rendering the use of such a remote server pointless and costly.

The proposed method overcomes this problem related to the potential interception and/or manipulation of a random number that is generated remotely by a server. More particularly, a symmetrical method for the cogeneration (in the sense of creation) of a random number involving three (at least) data processing devices is proposed. The method described allows a high-quality random number to be obtained, while reducing or eliminating the risk of fraud or of this random number being intercepted.

Thus, the present technique relates to a method for cogenerating a shared cryptographic material, which method is implemented within a first electronic device, said electronic device being connected to a second electronic cogeneration device via a communication network, said second electronic device also implementing the method for cogenerating the shared cryptographic material, the method being characterised in that it is furthermore implemented by a third electronic cogeneration device, connected to said first electronic cogeneration device and to said second electronic cogeneration device.

More particularly, according to the present technique, the cogeneration method is based on the common use, by the three devices involved in the cogeneration, of a set of cogeneration parameters. According to the present technique, in one specific embodiment, this set of parameters comprises in particular a cyclic group G (or a subgroup of a cyclic group), of generator g and of order p. This set further comprises a common hash function H. This set of cogeneration parameters is denoted ECG. In one general embodiment, where these cogeneration parameters ECG are known, each device involved in the cogeneration implements an identical method. The purpose of this cogeneration is to compensate for the possible deficiencies of one of the three devices, in order to obtain a high-quality random number, without the risk of this number being exposed or manipulated.

For the purpose of this description, cogeneration is considered to be tripartite and to be implemented by three electronic devices named {A}, {B} and {C} respectively. Device {B} is also considered to be a consumer device that is not trusted as regards the quality of the random numbers it generates. This does not mean that it is a poor quality generation device, but only that this device can potentially be subject to external perturbations and/or manipulations that make the functioning thereof uncertain, and thus is not to be trusted, as a matter of principle. It is also assumed that the device {B} wishes to exchange data with the device {A} in a confidential manner (i.e. the contents of the exchanges from {A} to {B} and vice-versa are sought to be encrypted).

Within the scope of the present technique, a third device {C} is thus involved, which is connected to {A} and {B}. It is considered that {A} and {C} are not subject to external perturbations, for example because {A} and {C} are remote, protected servers and are beyond the reach of any perturbations, and/or because {A} and {C} are protected against external attacks and have hardware protection solutions that make it difficult or impossible for an attacker to monitor or manipulate them.

Thus, the device {A} can be a remote server, for example a bank server or a medical server, whereas the device {C} can be a server (also a bank server or a specific generation server) or a particular cogeneration device, specifically dedicated to this task (it can be a stand-alone device, or can be integrated or connected to the device {A} or to the device {B}, such as a dedicated integrated circuit or a USB dongle for example, although such implementations are not preferred).

In other words, in the context of the present invention, there are two devices: a trusted device {A}, capable of generating a high-quality randomness (using any high-quality generation technique known to a person skilled in the art); and another device {B}, capable of performing any deterministic operation but not credited with generating a high-quality randomness. These devices are considered to communicate with one another, but it is not assumed that a secure channel has already been established therebetween. More specifically, establishing such a channel typically requires a high-quality random quality source; or requires the peripheral {B} to incorporate secret cryptographic keys. The problem with this second situation is that secure storage of secret keys in {B} can be difficult, since in the context of white-box attackers, such a key can be extracted. With typical public key designs, the leakage of such a decryption key immediately cancels the plan.

Thus, one proposal for overcoming this problem involves introducing a third trusted device {C} and a tripartite protocol for securely obtaining a shared randomness.

Figure 1:
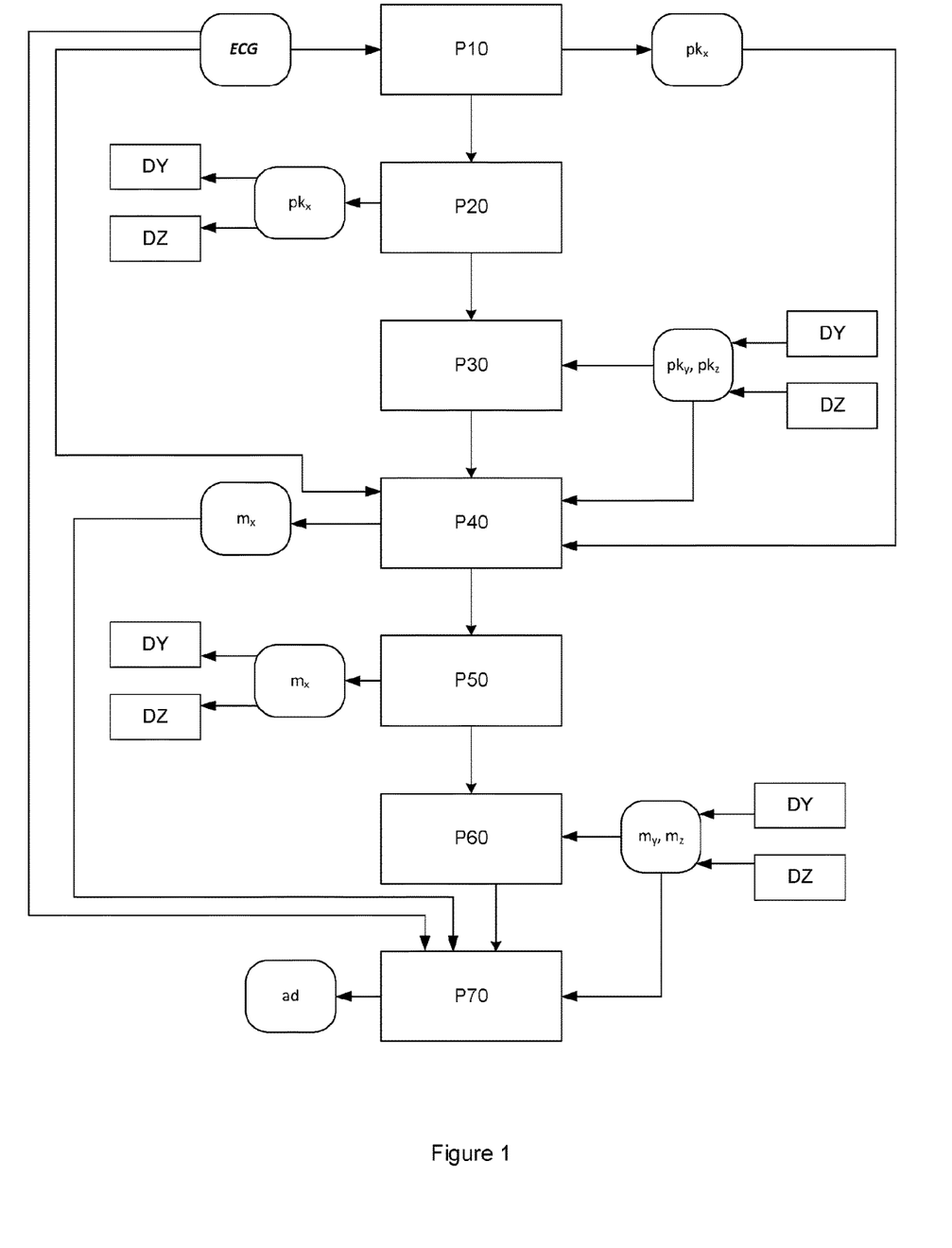
FIG. 1 shows the general principle of the cogeneration method.

According to the present technique, the method comprises several steps, some of which involve data exchanges between the three devices. According to the present technique, in one embodiment described with reference to FIG. 1, the following method is implemented by each device ({A}, {B}, {C}), and it comprises, for a device x, belonging to the set ({A}, {B}, {C}):
  a step of determining (P10) a shared encryption material (pkx), as a function of said set of cogeneration parameters ECG;
  a step of transmitting (P20) said shared encryption material (pkx);
  a step of receiving (P30) the corresponding shared encryption materials (pky, pkz) originating from the other devices;
  a step of computing (P40) a shared seed (mx), as a function of said shared encryption materials (pkx, pky, pkz) and said set of cogeneration parameters ECG;
  a step of transmitting (P50) a masked form (Ox) of said shared seed (mx);
  a step of receiving (P60) masked forms (Oy, Oz) of the corresponding shared seeds (my, mz) originating from the other devices;
  a step of computing (P70) the final seed (ad), as a function of the masked forms (Ox, Oy, Oz) of said shared seeds (mx, my, mz) and said set of cogeneration parameters ECG.

Thus, unlike the conventional method, involving only two devices {A} and {B}, the method of the present technique ensures that even if {B} is compromised, the final seed is of sufficient quality to procure an encryption of significant efficiency that will result from the use of this seed. Moreover, unlike the other conventional method, involving the use of an additional server directly transmitting a seed to the device {B}, the method of the present technique ensures that the seed transmitted by the additional server (which by analogy could be considered to be the device {C}) is not compromised, manipulated or intercepted, and for good reason: in the present technique, the device {C} never transmits a seed, but rather a masked form of a shared seed, this masked form ultimately being only one component of the final seed. As understood, this masked form is not intended to be unmasked (i.e. it is not intended, for the recipient of the masked form, to allow the initial value to be obtained), since the seed is final and is computed as a function of the masked forms, not as a function of the shared seeds. The initial seed is masked (scrambled) to form a value which in turn will be used to form the final shared seed.

Furthermore, since all the devices ({A}, {B}, {C}) participate in generating the same final seed, each participant ({A}, {B}, {C}) is able to verify that the final seed is correct by comparing its own final seed with the final seed obtained by the other participants. However, as two of the participants ({A} and {C}) are secure (a priori), they cannot be deceived. Moreover, it should be noted that with three (or more) participants, at least one thereof masks the random value produced by the other (i.e. in the case of three participants, the random value produced by {B} is actually masked: the random value, which is masked, can thus initially be equal to zero without any participant in the exchange being able to detect it (except, of course, the producer of this value). Thus, a malicious party producing this "non-random" value (i.e. 0 or another predetermined value) in an attempt to influence the seed cannot influence the randomness of the result. It goes without saying that the larger the number of participants, the lower the chances of obtaining a non-compliant result.

The method of the present technique has been described in a general manner. Some of the steps thereof are dependent on the set of cogeneration parameters ECG. In particular, a cyclic group is not always necessary in order to be able to implement the proposed technique, and other parameters can be used if they are found to be more adapted to the actual application situation.

Figure 2:
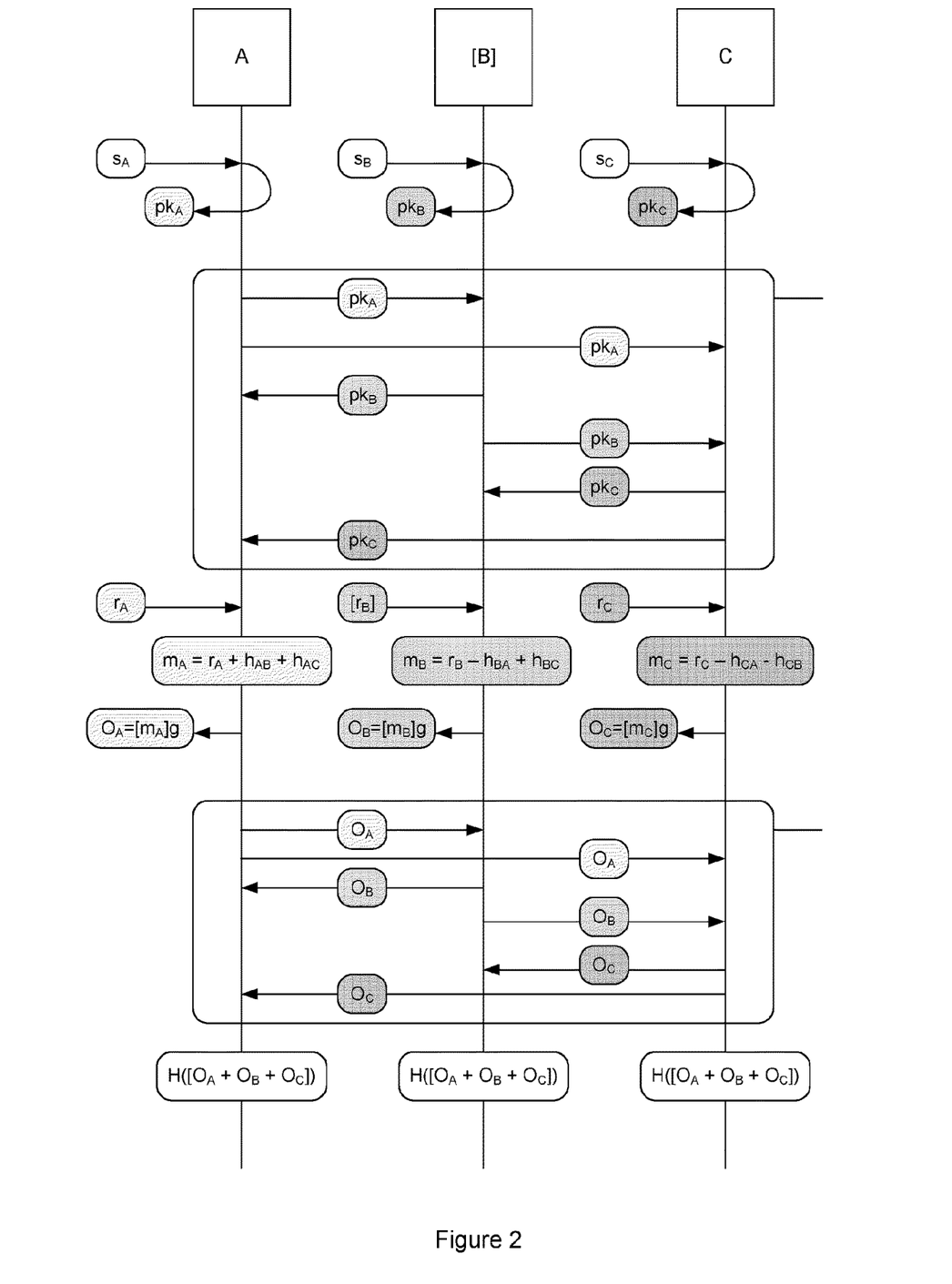
FIG. 2 shows a specific embodiment of the cogeneration method shown in FIG. 1.

Each step of the general method described hereinabove is described hereinbelow with reference to FIG. 2, in a certain embodiment.

The step of determining (P10) the shared encryption material (pkx), as a function of said set of cogeneration parameters ECG comprises:
  a step of selecting, within the cyclic group G (or within a subgroup of the cyclic group G), a number sx, smaller than p;
  a step of computing the shared encryption material (pkx) by performing an operation for the number sx with the generator g of the group G; the operation in question can be an additive operation or a multiplicative operation, depending on the nature of the group G. This operation is denoted, in this embodiment, between square brackets [ ]; thus, pkx=[sx]g.

The step of computing (P40) the shared seed (mx), as a function of said shared encryption materials (pkx, pky, pkz) and said set of cogeneration parameters ECG comprises:
  a step of obtaining a random number rx;
  a step of computing the shared seed mx from the random number rx and the shared encryption materials pkx, pky, pkz and the hash function H.

In this embodiment, this computation follows a particular rule as a function of a rank that the device has in the set of devices.

Thus, the device {A} specifically computes: mA=xA+hAB+hAC;

Thus, the device {B} specifically computes: mB=xB−hBA+hBC;

Thus, the device {B} specifically computes: mC=xC−hCA−hCB.

For each of these specific computations, hXY=H(pkA, pkB, pkC, [sX] pkY) is defined.

Depending on the embodiments and on the number of devices involved, other expressions for the shared seed mx can of course be defined.

The computation of the masked form (Ox) of said shared seed (mx) is carried out by performing an operation on the group, as for the computation of the shared encryption material. More particularly, the masked form Ox=[mx]g.

Still in this embodiment, the step of computing (P70) the final seed (ad), as a function of the masked forms (Ox, Oy, Oz) of said shared seeds (mx, my, mz) and said set of cogeneration parameters ECG comprises:
 a step of adding the masked forms (Ox, Oy, Oz); and
 a step of hashing, using the hash function H, the result of the previous addition, outputting the final seed (ad).

This final seed is thus the combination of all the seeds previously obtained, and it is noted that the method presented is manufactured in such a way that the result obtained is H([xA+xB+xC]g) which represents a seed of the expected quality. Other forms and embodiments of this protocol can be considered, leading to a similar or identical result.

This avoids the use of long-term secret keys and problems caused by a wrong seed. Moreover, it is also possible for (A) to verify that (B) has received the correct seed, since both devices know its value. For example, the following zero-knowledge protocol can be used:
 {A} (trusted device) sends a seed rT to {B};
 {B} responds to {A} by transmitting the result Res of the computation H (ad, rT);
 {A} verifies that H (ad, rT) corresponds to the result H (ad, rT) that {B} transmitted.

When the result is identical, it means that the final seed (ad) produced by {B} is identical to that produced by {A}, and thus that this final seed is a function of a high-quality seed rC that was created by {C}, without this seed rC having undergone any transformation, malicious act or usurpation. This is particularly true since the zero-knowledge protocol used previously can also be implemented between {A} and {C} in order to validate the final knowledge (ad) by {A} and {C}.

It should also be noted that, according to the present technique, it is advantageous to have three (or more) participants: one of which masks the random value produced by the device (B). Thus, rB can effectively be zero in the protocol hereinabove, without affecting the quality of the final random value (ad) obtained at the end of the method.

As an indication, a tangible implementation of the technique described hereinabove can be made with the following cyclic groups: Curve25519; sec256p, head 25619, Curve448. These groups allow for the generation of high-quality seeds in accordance with the present technique.

Moreover, any hash function can be used (SHA-1, MD5, etc.). However, the use of the SHA-3 function (in particular in SHAKE128 mode) has the advantage of being able to select the size of the output result, for example 256 bits, which is an advantage within the scope of the computation of the seed. In other words, with the use of this function, it is possible to determine, in advance, what the size of the integer resulting from the hashing will be and thus to adapt this size, for example, to the respective capacities of the devices {A} and {B} in order to ensure a compromise between the need for security and the processing capacities, in particular those of the device {B}.

In one specific embodiment, adapted for use in mobile communication terminals (such as smartphones), the selected output size is 256 bits. This means that the final seed has a length of 256 bits.

Figure 3:
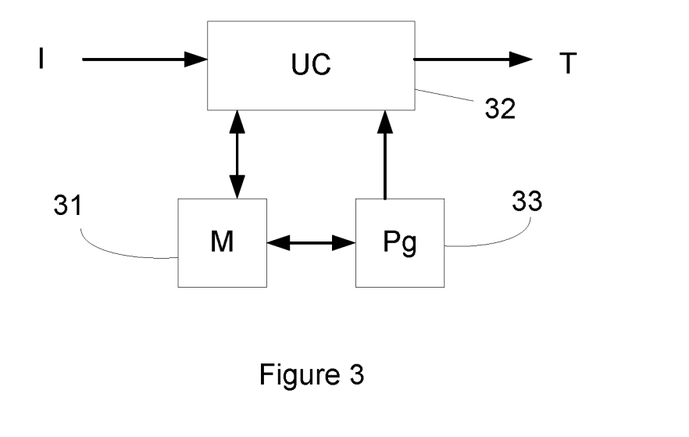
FIG. 3 shows a cogeneration device.

A simplified architecture of an electronic device capable of performing the seed cogeneration processing operation as presented hereinabove is shown with reference to FIG. 3. An electronic device comprises a memory 31, a processing unit 32 equipped, for example, with a microprocessor, and driven by a computer program 33, implementing the method as described hereinabove. In at least one embodiment, the present technique is implemented as an application installed on this device. Such a device comprises, according to the embodiments:
 means for determining a shared encryption material, as a function of said set of cogeneration parameters;
 means for transmitting said shared encryption material;
 means for receiving the corresponding shared encryption materials originating from the other devices;
 means for computing a shared seed, as a function of said shared encryption materials and said set of cogeneration parameters;
 means for transmitting a masked form of said shared seed;
 means for receiving masked forms of the corresponding shared seeds originating from the other devices;
 means for computing the final seed, as a function of the masked forms of said shared seeds and said set of cogeneration parameters.

As explained hereinabove, these means are implemented via modules and/or components, that are for example secure. They thus make it possible to uphold the confidentiality of the data required to define useful keys in a cryptosystem for data encryption.

The invention claimed is:

1. A method for cogenerating a shared cryptographic material implemented within a first electronic device, said first electronic device being connected to a second electronic cogeneration device and to a third electronic cogeneration device, the method comprising:
 determining a shared encryption material (pkx), as a function of a set of cogeneration parameters;
 transmitting said shared encryption material (pkx);
 receiving shared encryption materials (pky, pkz), which correspond to the shared encryption material (pkx), from the other devices;
 computing a shared seed (mx) as a function of said shared encryption materials (pkx, pky, pkz) and said set of cogeneration parameters;
 transmitting a masked form (Ox) of said shared seed (mx);
 receiving masked forms (Oy, Oz) of corresponding shared seeds (my, mz) originating from the other devices;
 computing a final seed (ad), as a function of the masked forms (Ox, Oy, Oz) of said shared seeds (mx, my, mz) and said set of cogeneration parameters; and
 using the final seed (ad) to encrypt contents of exchanges between the first electronic device and the second electronic cogeneration device and/or between the first electronic device and the third electronic cogeneration device.

2. The method according to claim 1, wherein determining the shared encryption material (pkx), as a function of said set of cogeneration parameters, comprises:

selecting, within a cyclic group G, a number sx, smaller than p; and computing the shared encryption material (pkx) by performing an operation for the number sx with the generator g of the group G.

3. The method according to claim 2, wherein the cyclic group G is selected from the group consisting of:

Curve25519;

sec256p;

head 25619; and

Curve448.

4. The method according to claim 1, wherein computing the shared seed (mx), as a function of said shared encryption materials (pkx, pky, pkz) and said set of cogeneration parameters comprises:

obtaining a random number rx; and computing the shared seed rx from the random number rx and the shared encryption materials pkx, pky, pkz and a hash function H.

5. The method according to claim 4, wherein said hash function is selected from the group consisting of:

SHA-1;

MD5; and

SHA-3, in SHAKE128 mode.

6. The method according to claim 1, wherein computing the final seed (ad), as a function of the masked forms (Ox, Oy, Oz) of said shared seeds (mx, my, mz) and said set of cogeneration parameters comprises:

adding the masked forms (Ox, Oy, Oz); and hashing, using a hash function H, the result of the previous addition, outputting the final seed (ad).

7. The method according to claim 6, wherein said hash function is selected from the group consisting of:

SHA-1;

MD5; and

SHA-3, in SHAKE128 mode.

8. The method according to claim 1, further comprising verifying the validity of the final seed (ad) comprising generating a random number and computing a hash value of a sum of said random number and the final seed.

9. A non-transitory computer-readable medium comprising a computer program product stored thereon comprising program code instructions for executing a method for cogenerating a shared cryptographic material when the instructions are executed by a processor, the method comprising:

determining a shared encryption material (pkx), as a function of a set of cogeneration parameters;

transmitting said shared encryption material (pkx);

receiving shared encryption materials (pky, pkz), which correspond to the shared encryption material (pkx), from the other devices;

computing a shared seed (mx) as a function of said shared encryption materials (pkx, pky, pkz) and said set of cogeneration parameters;

transmitting a masked form (Ox) of said shared seed (mx);

receiving masked forms (Oy, Oz) of corresponding shared seeds (my, mz) originating from the other devices;

computing a final seed (ad), as a function of the masked forms (Ox, Oy, Oz) of said shared seeds (mx, my, mz) and said set of cogeneration parameters; and using the final seed (ad) to encrypt contents of exchanges between the first electronic device and the second electronic cogeneration device and/or between the first electronic device and the third electronic cogeneration device.

* * * * *